United States Patent [19]

Larsen

[11] 4,111,917
[45] Sep. 5, 1978

[54] USE OF LATENT AMINES TO CURE EPOXY RESINS

[75] Inventor: Donald Wayne Larsen, Marriottsville, Md.

[73] Assignee: W. R. Grace & Co., New York, N.Y.

[21] Appl. No.: 685,481

[22] Filed: May 11, 1976

[51] Int. Cl.$^2$ ............................................. C08G 18/58
[52] U.S. Cl. ................................. 528/45; 260/830 P; 260/858; 528/58
[58] Field of Search ............... 260/77.5 R, 77.5 AP, 260/77.5 AM, 830 P, 858, 77.5 AB

[56] References Cited

U.S. PATENT DOCUMENTS

| | | | |
|---|---|---|---|
| 2,801,990 | 8/1957 | Seeger et al. | 260/77.5 TB |
| 2,830,038 | 4/1958 | Pattison | 260/77.5 AP |
| 3,087,912 | 4/1963 | Wagner et al. | 260/75 NH |
| 3,148,167 | 9/1964 | Keplinger | 260/858 |
| 3,313,747 | 4/1967 | Schramm | 260/77.5 R |
| 3,321,549 | 5/1967 | Barth | 260/2 N |
| 3,377,308 | 4/1968 | Oertel et al. | 260/858 |
| 3,404,130 | 10/1968 | Segura et al. | 260/77.5 |
| 3,440,292 | 4/1969 | Allen | 260/633 |
| 3,442,856 | 5/1969 | Floyd | 260/2 N |
| 3,454,621 | 7/1969 | Engel | 260/77.5 TB |
| 3,484,413 | 12/1969 | Kaufman | 260/77.5 AM |
| 3,510,439 | 5/1970 | Kaltenbach et al. | 260/830 P |
| 3,565,972 | 2/1971 | Harris | 260/830 P |
| 3,636,133 | 1/1972 | Hawkins | 260/830 P |
| 3,745,138 | 7/1973 | Koerner et al. | 260/77.5 TB |
| 3,761,452 | 9/1973 | Dawson | 260/77.5 AP |
| 3,931,116 | 1/1976 | Bernstein et al. | 260/77.5 R |

FOREIGN PATENT DOCUMENTS

763,347  12/1956  United Kingdom ............... 260/830 P

OTHER PUBLICATIONS

Saunders et al–Polyurethanes, Part I, Interscience, New York (1962), pp. 103–111.

*Primary Examiner*—H.S. Cockeram
*Attorney, Agent, or Firm*—Howard J. Troffkin

[57] ABSTRACT

The invention relates to certain urethanes or polyurethanes that are decomposed by heating in the range 100°–200° C to give reactive amines or polyamines that are useful for curing epoxy resins, polyisocyanates, polyacids, polyanhydrides, polyketones, polyhalides and others in a relatively short curing period, less than 2 hours and usually less than 10 minutes. These cured resins are useful as adhesives, sealants, coatings, etc. These latent amine groups may be part of a one component system comprising a self-curing epoxy-urethane resin curable by heating.

10 Claims, No Drawings

USE OF LATENT AMINES TO CURE EPOXY RESINS

This invention relates to resin curing agents suitable for curing epoxy resins, polyisocyanates, polyacids, polyanhydrides, polyketones, polyhalides and the like comprising modified urethanes or polyurethanes which decompose on heating = the 100°–200° C range to give a reactive amine or polyamine curing agent.

Aliphatic and aromatic amines are widely used as curing agents for epoxy resins but there are several drawbacks to their use. For example, normally, the epoxy resin, amine blends have a limited pot life. This problem is aggravated in most instances by the necessity of premelting one or both of the components using quite high temperatures for blending. Furthermore, continuous changes in the viscosity of the blend can drastically affect the application, flow and leveling of the system prior to curing. Epoxy resin, amine blends are generally unsuitable for use as powder coatings or "organic solders" for tin cans. Skin sensitization and toxicity is also a well known problem with some amines.

An object of the present invention is a new and improved resin curing agent.

A further object is a new and improved latent curing agent.

An additional object is a new and improved one component, self-curable epoxy-urethane resin.

Another object is a new and improved powder coating.

A further object is new processes for achieving the foregoing objects.

Other objects will be apparent from the following description of the invention.

The above objects are obtained by a urethane compound capable of forming free amine when heated to 100°–200° C comprising the reaction product of an isocyanate of the formula R—NCO)$_n$ wherein R is a mono or polyvalent organic moiety and $n$ is 1-3 and a secondary or tertiary alcohol of the formula

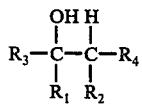

wherein R$_3$ is a radical member of the group consisting of alkyl, alkyl substituted with alkoxy, aryloxy, heterocyclic and combinations thereof, cycloalkyl, heterocyclic, aryl, acyl formyl, carboxyl and amides and esters thereof, alkenyl, nitrile and combinations thereof; R$_4$ is a radical member of the group consisting of H, alkyl, cycloalkyl, heterocyclic, aryl, halo, acyl, formyl, carboxyl and amides and esters thereof, alkenyl, nitrile, alkoxy, aroxy, hydroxy, acyloxy, amino, thiol, thioalkyl and combinations thereof; and R$_1$ and R$_2$ are radical members independently selected from the group consisting of H, alkyl, cycloalkyl, heterocyclic, acyl, formyl, carboxyl and esters and amides thereof, aryl, alkenyl and combinations thereof and R$_1$ and R$_2$ can be members of a cyclic or heterocyclic ring, but where R$_1$ is H, then at least one of R$_2$, R$_3$ and R$_4$ must be a chemically compatible member of the group consisting of heterocyclic, aryl, alkenyl, halo, acyl, formyl, nitrile, alkoxy, aroxy, carboxyl and esters and amides thereof, acyloxy, amino, thiol, thioalkyl and combinations thereof. The thus formed urethane reaction product containing latent amine when heated in the range 100°–200° C forms free amine. Such compounds are useful for resin curring reactions, the latent amine being stable at the temperature of the application of the resin, but when heated in the range 100°–200° C, the latent amine becomes a free amine which quickly cures the resin. When the alcohol contains a heterocyclic group, the hetero atom can be oxygen, nitrogen or sulfur. Thus an example of an alcohol of this type would be the reaction product of epichlorohydrin and Bisphenol A to form

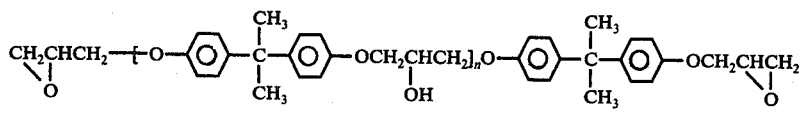

wherein $n$ is at least 0.5. The epoxy containing alcohols after reaction with an isocyanate to form a latent amine are self-curing on being heated in the range 100°–200° C.

The alcohols operable in the instant invention are tertiary alcohols and secondary and tertiary alcohols with substituents in the alpha or beta position that tend to activate dehydration. Such alcohols include, but are not limited to 2-methyl-2-propanol; 2-methyl-2-butanol; 2-methyl-2-pentanol; 3-methyl-3-pentanol; 2,3-dimethyl-2-butanol; 2-methyl-2-hexanol; 3-methyl-3-hexanol; 2,3-dimethyl-2-pentanol; 2,3-dimethyl-3-pentanol; 2,3,3-trimethyl-2-butanol; 2-methyl-2-heptanol; 3-methyl-3-heptanol; 4-methyl-4-heptanol; 3-ethyl-3-hexanol; 2,3-dimethyl-2-hexanol; 2,5-dimethyl-2-hexanol; 2,3-dimethyl-3-hexanol; 3,4-dimethyl-3-hexanol; 3,5-dimethyl-3-hexanol; 3-ethyl-2-methyl-2-pentanol; 3-ethyl-2-methyl-3-pentanol; 2,2,3-trimethyl-3-pentanol; 2,3,4-trimethyl-3-pentanol; 2-methyl-2-octanol; 3-methyl-3-octanol; 4-methyl-4-octanol; 3-ethyl-3-heptanol; 4-ethyl-4-heptanol; 2,3-dimethyl-3-heptanol; 3,5-dimethyl-3-heptanol; 3,6-dimethyl-3-heptanol; 2,4-dimethyl-4-heptanol; 2-methyl-2-nonanol; 3-methyl-3-nonanol; 4-methyl-4-nonanol; 5-methyl-5-nonanol; 2,3-dimethyl-3-octanol; 3,6-dimethyl-3-octanol; 3,7-dimethyl-3-octanol; 4,7-dimethyl-4-octanol; 4-propyl-4-heptanol; 3-ethyl-2-methyl-2-heptanol; 2,4,6-trimethyl-4-heptanol; 3,4,5-trimethyl-4-heptanol; 3,4-diethyl-3-hexanol; 3-buten-2-ol; 3-penten-2-ol; 4-penten-2-ol; 1-penten-3-ol; 2-methyl-3-buten-2-ol; 3-methyl-3-buten-2-ol; 5-hexen-3-ol; 2-methyl-4-penten-2-ol; 3-methyl-4-penten-2-ol; 4-methyl-4-penten-2-ol; 2-methyl-1-penten-3-ol; 3-methyl-1-penten-3-ol; 4-methyl-1-penten-3-ol; 3-methyl-3-penten-2-ol; 4-methyl-3-penten-2-ol; 2,3-dimethyl-3-buten-2-ol; 1-hepten-3-ol; 2-hepten-4-ol; 3-methyl-3-hexen-2-ol; 2-methyl-5-hexen-2-ol; 3-methyl-1-hexen-3-ol; t-2-methyl-4-hexen-3-ol; 2-methyl-5-hexen-3-ol; 3-methyl-5-hexen-3-ol; 5-methyl-5-hexen-3-ol; 2,3-dimethyl-4-penten-2-ol; 2,4-dimethyl-4-penten-2-ol; 2,4-dimethyl-1-penten-3-ol; 2-octen-4-ol; t-2-octen-4-ol; 2-methyl-1-hepten-3-ol; 4-methyl-4-hepten-3-ol; 4-methyl-1-hepten-4-ol; 3-ethyl-5-hexen-3-ol; 2,2-dimethyl-5-hexen-3-ol; 2,3-dimethyl-5-hexen-3-ol; 2,5-dimethyl-5-hexen-3-ol; 3,4-dimethyl-5-hexen-3-ol; 3,5-dimethyl-5-hexen-3-ol; 2,4-dimethyl-1-hepten-4-ol; 2,3,4-trimethyl-5-hexen-3-ol; 4-propyl-1-hepten-4-ol; 1,5-hexadien-3-ol; 1,5-heptadien-4-ol; 1,6-heptadien-4-ol; 2-methyl-1,5-hexadien-3-ol; 5-methyl-1,5-hexadien-3-ol; t-2-methyl-1,5-heptadien-4-ol; 4-methyl-1,6-heptadien-4-ol; 4-propyl-1,6-heptadien-4-ol; 2,5-dimethyl-1,5-hexadien-3-ol; 3,5-dimethyl-1,6-heptadien-4ol; 2,6-dimethyl-1,6-heptadien-4-ol; 3,7-dimethyl1,6-octadien-3-ol; 4-allyl-1,6-heptadien-4-ol; 2,4,6-trimethyl-1,6-heptadien-4-ol; 3,7,11-trimethyl-1,6,10-dodecatrien-3-ol; 3-butyn-2-ol; 4-pentyn-2-ol; 1-pentyn-3-ol; 2-methyl-3-butyn-2-ol; 4-hexyn-2-ol; 5-hexyn-3-ol; 2-methyl-3-pentyn-2-ol; 3-methyl-1-pentyn-3-ol; 4-methyl-1-pentyn-3-ol; 4-heptyn-2-ol; 1-heptyn-3-ol; 5-heptyn-3-ol; 3-methyl-1-hexyn-3-ol; 3-methyl-4-hexyn-3-ol; 3,4-dimethyl-1-pentyn-3-ol; 4-octyn-2-ol; 1-octyn-3-ol; 4-methyl-1-heptyn-3-ol; 4-methyl-2-heptyn-4-ol; 3,5-dimethyl-1-hexyn-3-ol; 3,4,4-trimethyl-1-pentyn-3-ol; 5-nonyn-3-ol; 3-methyl-1-octyn-3-ol; 3,6-dimethyl-1-heptyn-3-ol; 5-methyl-5-hexen-3-yn-2-ol; 6-methyl-6-hepten-4-yn-2-ol; 3-methyl-6-hepten-1-yn-3-ol; 6-methyl-6-hepten-4-yn-3-ol; 2,5-dimethyl-5-hexen-3-yn-2-ol; 7-methyl-7-octen-5-yn-3-ol; 3,6-dimethyl-6-hepten-4-yn-3-ol; 4,7-dimethyl-7-octen-5-yn-4-ol; 2,3,6-trimethyl-6-hepten-4-yn-3-ol; 2,6-dimethyl-1-nonen-3-yn-5-ol; 2,5-dimethyl-1-decen-3-yn-5-ol; 5-ethyl-2-methyl-1-nonen-3-yn-5-ol; 2,5,8-trimethyl-1-nonen-3-yn-5-ol; 1-methylcyclopentanol; 1-ethylcyclopentanol; 1,2-dimethylcyclopentanol; 1,2-dimethylcyclopentanol; 1,3-dimethylcyclopentanol; 1-propylcyclopentanol; 1-butylcyclopentanol; 1-pentyl-cyclopentanol; 1-methylcyclohexanol; 1-ethylcyclohexanol; 1-propylcyclohexanol; 1-butylcyclohexanol; 1-methyl-4-iso-propylcyclohexanol; 1,3,3,5,5-pentamethylcyclohexanol; 1,2-diethylcyclohexanol; 1-(nitromethyl)cyclohexanol; 2-(4-methylcyclo-3-hexenyl)-2-propanol; 1-allylcyclohexanol; 1-ethynylcyclohexanol; 1-propynylcyclohexanol; 1-(1-butynyl)cyclohexanol; 1-(1-butynyl)cyclopentanol; 1-ethynylcyclopentanol; 1-methylcycloheptanol; 1-ethynylcycloheptanol; 1-methylcyclooctanol; 1-ethynylcyclooctanol; 1-phenylethanol; 1-phenyl-1-propanol; 1-phenyl-2-propanol; 2-phenyl-2-propanol; 1-(2-methylphenyl)ethanol; 1-(4-methylphenyl)ethanol; 1-phenyl-1-butanol; 2-phenyl-2-butanol; 2-methyl-1-phenyl-1-propanol; 2-methyl-1-phenyl-2-propanol; 1(2,4-dimethylphenyl)ethanol; 1-phenyl-1-pentanol; 2-phenyl-2-pentanol; 3-phenyl-3-pentanol; 2-methyl-1-phenyl-1-butanol; 2,2-dimethyl-1-phenyl-1-propanol; 1-(3,4,5-trimethoxyphenyl)ethanol; 2-(l-naphthyl)-2-propanol; phenyl cyclopentyl glycolic acid; 2-methyl-4(4-hydroxyphenyl)-2-butanol; 2-phenyl-4-penten-2-ol; 2-phenyl-3-butyn-2-ol; 4-phenyl-3-butyn-2-ol; 1-phenyl-1-pentyn-3-ol; 2-methyl-4-phenyl-3-butyn-2-ol; 1-phenyl-1-hexyn-3-ol; 6-phenyl-5-hexyn-3-ol; 3-methyl-1-phenyl-1-pentyn-3-ol; 4-methyl-1-phenyl-1-pentyn-3-ol; 3-ethyl-1-phenyl-1-heptyn-3-ol; 1-(phenylethynyl)cyclohexanol; 1(phenyl-ethynyl)cyclopentanol; cyclopentylphenylmethanol; 1-phenylcyclopentanol-1; 1-phenylcyclohexanol; 2-phenylcyclohexanol; 1-(3-methylphenyl)cyclohexanol; 1-(4-fluorophenyl)cyclohexanol; 1-(2-methylphenyl)cyclohexanol; 2-(4-methoxyphenyl)cyclohexanol; 1,1,2-triphenylethanol; 1,2-propanediol; 1,3-butanediol; 2,3-butanediol; 2,4-pentanediol; 2-methyl2,4-pentanediol; 2,3-dimethyl-2,3-butanediol; 2,5-dimethyl-2,5-hexanediol; 2,7-dimethyl-1,7-octanediol; 2,7-dimethyl-2,7-octanediol; 3,6-dimethyl-3,6-octanediol; 3,8-dimethyl-3,8-decanediol; 2,4,4-trimethyl-2,3-pentanediol; 3-methyl-2,3-pentanediol; 3-hexene-2,5-diol; 6-heptene-2,4-diol; 3-hexyne-2,5-diol; 2,5-dimethyl-3-hexyn-2,5-diol; 3,6-dimethyl-4-octyn-3,6-diol; 4,7-dimethyl-5-decyn-4,7-diol; 3,6-diethyl-4-octyn-3,6-diol; 2,4,7,9-tetramethyl-5-decyne-4,7-diol; 2,7-dimethyl-3,5-octadiyn-2,7-diol; 3,8-dimethyl-4,6-decadiyne-3,8-diol; 3-methylcyclopentane-1,2-diol; t-cyclohexane-1,2-diol; 1,1'-dihydroxybicyclohexyl; 1-(hydroxymethyl cyclobutanol); 1,2,3,4-tetrahydronaphthalene-2,3-diol; 1,1'-dihydroxy-3,3',5,5,5',5'-hexamethyldicyclohex-2,2'-ene; 1,5-hexadien-3,4-diol; 1,6-diphenyl-1,5-hexadien-3,4-diol; glycerol; 1,2,6-hexanetriol; 2,6-dimethyl-8,8-dimethoxy-2-octanol; 1-ethoxy-3-chloro-2-propanol; 1-phenoxy-3-chloro-2-propanol; 1-chloro-2-propanol; 3-chloro-1,2-propanediol; 1,3-dichloro-2-propanol; 1,3-dibromo-2-propanol; 3-hydroxy-2-butanone; 4-hydroxy-4-methyl-2-pentanone; 1-acetyl-cyclohexanol; 1,3-diphenyl-3-hydroxy-1-butanone; 3,7-dimethyl-7-hydroxyoctanol; 3-hydroxybutanal; 3-hydroxy-3-phenylbutyraldehyde; 2-ethyl-2-hydroxy-butyric-acid; 3-hydroxybutyric acid; ethyl lactate; 2-methyllactic acid; lactonitrile; methyl lactonitrile; methyl lactamide; trimethyl citrate; 2-methylmalic acid; diallyl malate; diisopropyl tartrate; N-lactoyl-phenetidine; 2-cyclohexylglycollic acid; 2-hydroxy-3-amino-butyric acid; ethyl-2-methyl-2-hydroxypropylamine hydrochloride; 1-naphthyl-2-hydroxy-3-methoxypropylamine; 3(1-piperidyl)-1,2-propanediol; 5,6-dimethyl-2(2-hydroxy-2-propyl)-benzimidazole; phenyl-2-hydroxy-2-phenylethylamine; 1,2-bis(2-pyridyl)-1,2-ethanediol; 1-phenyl-2(1-morpholinyl ethanol; 1-(2-pyridyl)-1,2-ethanediol; 1,3(1-1-morpholinyl)-2-propanol; 5-hydroxy-1,3-dioxane; 3-methyl3,5-dihydroxycaproic acid lactone; N-(2-pyridylmethyl)-3-hydroxypiperidine; 1-benzyl-4-hydroxy-4(4-methylphenyl)piperidine; 3-phenyl-3-hydroxypyrolidine; cortisone; digitoxigenin and the like.

Urethanes derived from monoisocyanates and polyisocyanates and easily dehydrated alcohols are readily decomposed by heat to produce amines. These urethanes can be formed without dehydrating the alcohols at low temperature (25° to 90° C). In some instances, an organometallic catalyst, e. g. stannous octoate, dibutyltin dilaurate, nickel acetyl acetonate, is employed to form the urethane. These reactions are carried out at low temperature (25° to 90° C) to avoid dehydration of the alcohol. Nonreactive solvents such as ethyl acetate, dimethylformamide, acetone, benzene and the like may be used, if desired, to facilitate the handling of high molecular weight reactants, crystalline products, etc.

Any aliphatic or aromatic mono-or polyisocyanate is operable herein to react with alcohol to form urethanes containing latent amines which on heating to 100°–200° C decompose to form reactive amines. Although all mono- or polyisocyanates are operable herein, the choice of one is usually made on the basis of commercial availability. Operable commercially available monoisocyanates include, but are not limited to p-chlorophenyl isocyanate, polymethylene polyphenyl isocyanate, phenyl isocyanate, o-, m-, and p-chlorophenyl isocyanates, 2,5-dichlorphenyl isocyanate, 3,4-dichlorophenyl isocyanate, methyl and ethyl isocyanates, propyl isocyanate, isopropyl isocyanate, n-butyl isocyanate, cyclohexyl isocyanate and octadecyl isocyanate. Polyisocyanates which are commerically available include, but are not limited to a polyaryl polyisocyanate as defined in U.S. Pat. No. 2,683,730, tolylene diisocyanate, pure or mixed isomers, triphenylmethane-4,4',4",-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, naphthalene-1, 5-diisocyanate, 3,3'-dimethyl-4,'-biphenylene diisocyanate, 2,2',5,5'-tetramethyl-4,4'-biphenylene diisocyanate, 4,4'-methylenebis (phenylisocyanate), 4,4'-sulfonylbis (phenylisocyanate), 4,4'-methylene di-orthotolylisocyanate, ethylene diisocyanate, trimethylenediisocyanate, isophorone diisocyanate, dianisidine diisocyanate, o-tolidine diisocyanate, m-tolidine, diisocyanate, hexamethylene diisocyanate, 2,2,4-trimethylhexamethylene diisocyanate, 2,4,4-trimethyl-hexamethylene diisocyanate, 4,4'-dicyclohexylmethane diisocyanate, diphenylether 4-4'-diisocyanate, 1,3-bis(isocyanomethyl) cyclobutane, polymethylene polyphenyl isocyanate, naphthalene diisocyanate, m-xylylene diisocyanate, p-xylylene diisocyanate and isocyanate terminated prepolymers prepared from polymeric diols prereacted with two moles of aromatic or aliphatic diisocyanate.

The resulting mono- and polyurethanes decompose on heating at relatively low temperatures, e. g. 100°-200° C, to form an amine or polyamine curing agents. The amine or polyamine can cure epoxy resins, polyisocyanates, polyacids, polyanhydrides, polyketones, polyhalides, etc. One $NH_2$ group reacts with one isocyanate (NCO) group but reacts with two epoxide groups, i. e. NH functionality = 2.

The following examples will aid in explaining but expressly not limit the instant invention. Unless otherwise noted, all parts and percentages are by weight. Although many examples of urethane groups that serve as latent amine curing agents can be produced, the invention in the main will be described with respect to certain polyurethanes having two latent amine groups and also with respect to certain epoxy resins having latent amine functionality bonded to their backbone.

EXAMPLE 1

In a 500 cc resin kettle fitted with a stirrer, $N_2$ blanket, condenser and heating mantle 87.9 grams of tolylene diisocyanate (80/20 mixture of the 2,4- and 2,6-isomers) (1 eq. NCO) was dissolved in 88 grams of benzene and 0.1 cc of stannous octoate catalyst was added. 74 g of tert-butyl alcohol (1.0 mole) was added dropwise to the stirred mixture. The mixture was refluxed for 4 hours (80° C). A white crystalline latent amine product, i.e.

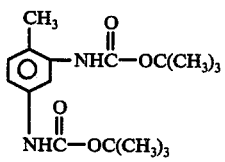

was obtained on cooling.

A mixture of 6.6 grams of the above solution, containing 4.23 grams latent amine (0.026 eq. latent amine) with 10 grams Epon 828 (0.053 eq. epoxide) was made up in a test tube. On heating the benzene boiled out and the homogeneous solution remained fluid for 1.5 hours at 100° C. This sample was gradually heated to higher temperatures. At 140° to 150° C the sample appeared to boil but no condensate formed on cool surfaces. The sample gradually became more viscous even as the temperature was increased to 175° C. At 197° C the sample set up as a rigid foam.

Three more samples were made up using the above latent amine in benzene with one equivalent of latent amine per two equivalents of epoxide using Epon 828 (liquid epoxy, 190 eq. weight), Epon 1031 (tetrafunctional, 225 g, eq. weight) and Epon 1001 (solid, 500 eq. weight). All three samples had a pot life of at least 6 days at 100° C. When heated to 200° C, all three samples cured within 8 to 64 minutes. A portion of the Epon 828 containing mixture was also caoted as a thin film (1 to 5 mils) on steel can stock and heated to 200° C. The resultant cured coating adhered well to the steel substrate. The cured film is a gold color. Normally, Epoxy resins cured with aromatic amines yield very dark cured products due to oxidation of the amine.

EXAMPLE 2

A solution of 54 grams (0.12 eq. NCO) of Adiprene L-315 (445 eq. weight), i.e.

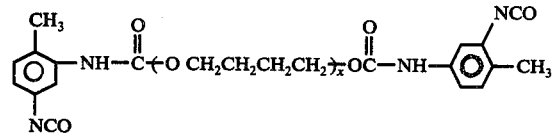

commercially available from E. I. DuPont, 8.5 grams lactonitrile (0.12 mole) and 0.1 g of stannous octoate in 54 g. benzene was heated to reflux the benzene for one hour, then left at room temperature overnight.

9.8 grams of the solution (5.25 g urethane, 0.01 eq. latent amine) were mixed with 5 grams Epon 1001 (0.01 eq. epoxide). The admixture cured very slowly at 100° C. Using a hot air gun at about 200° C, a bubble free film coating on steel can stock was obtained in 3 minutes. A flexible foam was made by curing a sample in a test tube. This admixture has a pot life of at least 10 days at 60° C, and over 6 months at room temperature.

Another sample of the latent amine solution, 9.3 grams (5 grams urethane, 0.008 (eq. latent amine) with 5.5 grams Adiprene L-200, 560 eq. weight (0.01 eq. NCO) cured to a tough, flexible film. The latent amineisocyanate mixture is stable for more than 23 days at room temperature.

EXAMPLE 3

15 grams of commercially available hexamethylene diisocyanate, (HDI) (0.18 eq. NCO), 13 grams lactonitrile (0.18 mole) and 3 drops of stannous octoate in 52 grams benzene were reacted at room temperature until the NCO content was substantially zero.

A mixture of 4.35 grams of the resultant latent amine solution (1.5 gram urethane, 0.01 eq. latent amine) and 5 grams Epon 1001 (0.01 eq. epoxide) were mixed homogeneously. The urethane reactant was partially insoluble at room temperature, but both reactants were soluble at 60° C. The admixture cured at 200° C in 16 minutes.

Table I shows a series of latent amines based on tolylene diisocyanate and various easily dehydrated alcohols. The diurethanes were formed by the same procedure used in Examples 1–3 except that the diurethanes used to cure Epon 828 were isolated by filtering out the benzene and drying the diurethanes under vacuum. In the examples where Epon 1001 and 1002 were used, the benzene was not removed but was used to dissolve the Epon in the solution. The benzene was then evaporated off on heating at about 90° C prior to the curing reaction.

Most of the diurethanes are crystalline solids that are easily purified. The examples are listed in the order of decreasing cure rates with epoxy resins.

TABLE I
CURE RATES OF EPOXY RESINS WITH LATENT AMINES AT 200° C

| Example No. | latent Amine Component Formula[a] | Alcohol Name | Type | Activating Group | Epoxy-Containing Component(c) Epon | Time to Cure, Min. at 200° C |
|---|---|---|---|---|---|---|
| 4 | TAl$_2$[b] | Aldol | 2° | β—HC=O | 1001 | 1–2 |
| 5 | TMl$_2$ | Methyl lactonitrile | 3° | α—C≡N | 1001 | 1–2 |
| 6 | TDa$_2$ | Diacetone alcohol | 3° | β—RC=O | 828 | 2–4 |
| 7 | TLn$_2$ | Lactonitrile | 2° | α—C≡N | 1001 | 2–4 |
| 8 | Dicyandiamide[d] | — | — | — | 1002 | 4–8 |
| 9 | TBu$_2$ | tert-Butyl alcohol | 3° | — | 828 | 16–32 |
| 10 | TMb$_2$ | α-Methyl benzyl alcohol | 2° | α—⟨O⟩ | 1001 | 16–32 |
| 11 | TEl$_2$ | Ethyl lactate | 2° | α—COOR | 1001 | 60–120 |
| 12 | TBe$_2$ | 3-Buten-2-ol | 2° | —CH=C-H$_2$ | 1001 | 120– |
| 13 | TLm$_2$ | Lactamide | 2° | α—CONH$_2$ | 828 | <240 |

[a]T = TDI = tolylene diisocyanate; two letter symbols used for alcohol.
[b]Typical reaction to form latent amine component

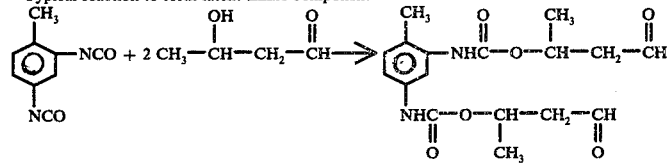

Tolylene diisocyanate T    Aldol Al    Latent amine TAl$_2$

[c]Shell epoxy resins: Epon 828, epoxide equivalent 185–192; Epon 1001, epoxide equivalent 450–550 and Epon 1002, epoxide equivalent 600–700.
[d]Curing agent included for comparison, commercially available from American Cyanamid.

Subsequent tests as shown in Table II show that some of these blends cure readily at 175° C and 150° C. The most unstable urethanes do have a limited pot life. The crystalline diacetone alcohol adduct, TDa$_2$, decomposed after standing for several months. Other urethanes such as TAl$_2$ and TLn$_2$ have been stored several years as blends with epoxy resins and still give fast cures (2–4 minutes at 200° C).

Table II
Latent Amine/Epoxy Cure Times

| Ex. No. | Latent Amine Component[a] | Epoxy-Containing Component | Cure Time (min.)[b] 200° C | 175° C | 150° C | Pot Life[c] Days |
|---|---|---|---|---|---|---|
| 14 | TMl$_2$ | Epon 1001 | 1–2 | 1–4 | | 25–32 |
| 15 | TAl$_2$ | Epon 1001 | 1–2 | 2–4 | 2–8 | 500+ |
| 16 | TLn$_2$ | Epon 1001 | 2–4 | 4–8 | 4–8 | 500+ |
| 17 | TDa$_2$ | Epon 828 | 2–4 | 4–8 | | 70 |

[a]T=Tolylene diisocyanate, Ml=Methyl lactonitrile, Al=Aldol, Ln=Lactonitrile, Da=Diacetone alcohol
[b]On cover glass on hot stage
[c]Room temperature It is obvious that the stability of the urethane can be varied at will by varying the type and number of substituents of the alcohol. The stability of urethane groups to heat will depend mainly on the alcohol precursors. For example, in Table I a comparison of Examples 6 and 9 shows that a less stable urethane can be formed by merely replacing one hydrogen with a ketone group on one of the methyl groups on the t-butyl alcohol. Further, Examples 4, 7 and 10 show that carbonyl and nitrile groups are more effective than phenyl in activating the decomposition of urethanes based on secondary alcohols. Thus, it is possible by the method taught herein to make a set of products having a wide range of reactivities.

The urethane curing agents of the instant invention are much safer to use and give more stable blends with epoxy resins, isocyanate prepolymers, etc., than conventional amine curing agents. This is due to the fact that normally both urethane groups of a latent amine based on a diisocyanate would not decompose at the same time. Thus, the initially formed —NH$_2$ group reacts with epoxide, etc., before the second group decomposes making it unlikely that any substantial amount of free diamine is formed during the course of the curing process.

The latent amines based on isocyanate prepolymers give virtually no volatile diamine since the prepolymers consist mainly of TDI molecules bound to a polyol skeleton by a stable urethane bond. Even if free diamine is formed, it would be a nonvolatile material with a polymeric backbone.

Table III illustrates the use of various urethanes formed from various diisocyanates reacted with lactonitrile as curing agents for various resins. The urethanes were formed using the proper reactants and the procedure of Examples 1–3 in benzene.

TABLE III
RATE OF CURE AT 200° C
VARIOUS DIISOCYANATES CAPPED WITH LACTONITRILE

| No. | Latent Amine Formula[a] | Diisocyanate Type | Resin[c] | Time to Cure Min./200° C |
|---|---|---|---|---|
| 18 | ET$_2$Ln$_2$[b] | Polyether | E-828 | 1–2 |
| 19 | " | " | ADNC | 1–2 |
| 20 | LLn$_2$ | Polyether | L-200 | 1–2 |
| 21 | " | " | E-1001 | 2–4 |
| 22 | TLn$_2$ | Aromatic | E-1001 | 2–4 |
| 23 | SLn$_2$ | Polyester | E-1009 | 4–8 |

TABLE III-continued
RATE OF CURE AT 200° C
VARIOUS DIISOCYANATES CAPPED WITH LACTONITRILE

| No. | Latent Amine Formula[a] | Diisocyanate Type | Resin[c] | Time to Cure Min./200° C |
|---|---|---|---|---|
| 24 | HLn$_2$ | Aliphatic | E-1001 | 8–16 |

[a]E = PEG-1000; a polyethylene ether glycol having a M.W. of 1000 and a hydroxyl no. of 112, commercially available from Dow.
T = Tolylene diisocyanate, commercially available from E. I. DuPont (80% 2,4 isomer/20% 2,6 isomer)
Ln = Lactonitrile
L = Adiprene L-315; a liquid fully saturated urethane polymer having an available isocyanate content of 9.25–9.65%, commercially available from E. I. DuPont
S = Solithane 291; a urethane polymer having an available isocyanate content of 3.2%, commercially available from Thiokol Chemical Co.
H = HDI; hexamethylene diisocyanate, commercially available from Mobay Chemical Co.
[b]Typical reaction to form latent amine component

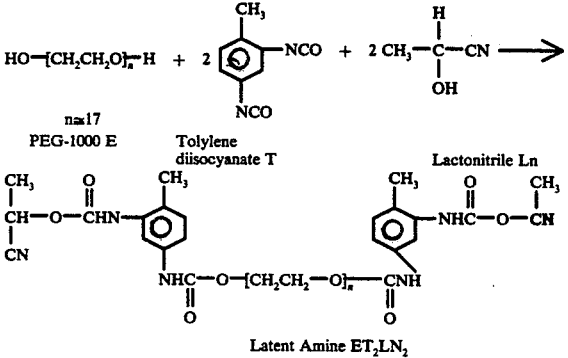

Latent Amine ET$_2$LN$_2$

[c]E-828; E-1001; E-1009 = Shell Chemical Co. epoxy resins having an epoxide equivalent of 185–192; 450–550 and 2500–4000, respectively
ADNC = Adiponitrile carbonate, commercially avaiable from Arco Chemical Co.
L-200 = a liquid fully saturated urethane polymer having an available isocyanate content of 7.3–7.7%, commercially available from E. I. DuPont The latent amine of Example 20, i.e. LLn$_2$ mixed with a diisocyanate prepolymer (Adiprene L-200) remained fluid for at least a month and cured rapidly at 200° C.

Example 19, a latent amine, was mixed with ADNC, a blocked isocyanate, to give a very stable, curable composition.

The following discussion refers in detail to a special case of the latent amine group curing agent, namely the self-curing epoxy urethane resin type. To form the self-curing epoxy-urethane resin, an epoxy resin of the general formula

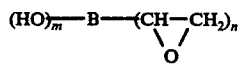

where B is an organic polyvalent moiety, n is at least about 2 and m is 0.5 or greater; containing hydroxyl groups that are sensitive to dehydration is reacted with an organic isocyanate to obtain an epoxy-containing urethane adduct, which adduct on heating in the range 100°–200° C decomposes to produce a reactive amine; said reactive amine then cures the epoxy resin by addition to the epoxide groups.

Epoxy resins based on Bisphenol A and epichlorohydrin as illustrated in Formula I

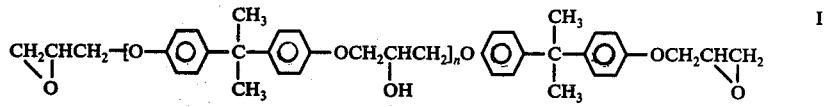
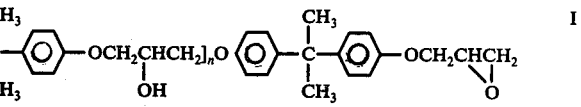

vary greatly in hydroxyl functionality, n. All, or part, of the hydroxyl groups can be reacted with organic (poly) isocyanate to give a urethane adduct II

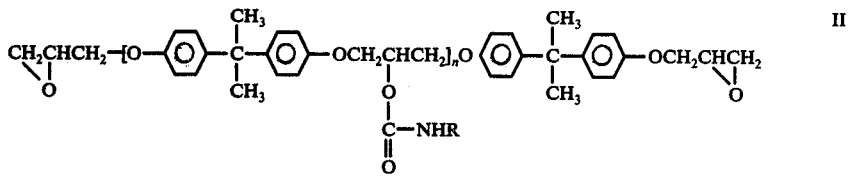
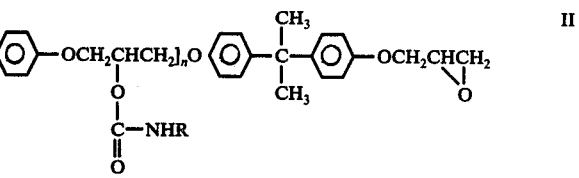

This resin is stable at ambient temperatures but decomposes on heating to produce a reactive amine. The reactive amine then cures the epoxy resin. The beta aromatic ether groups of II activate the urethane pyrolysis reaction.

Glycidyl derivatives of various phenols, aliphatic polyols, amines, thiols, acids, amides, etc., are known having structures similar to that of I but with various aroxy, alkoxy, thioalkyl, acyloxy or amino groups beta to the OH.

Low molecular weight epoxy resins can be chain-extended by reacting them with diols, amines, dithiols, diacids, etc., to give modified products. For example, the reaction of two moles of a polyepoxide with one mole of a primary amine gives a product with two hydroxyl groups activated by beta amine. Further activation can be provided by the substituents of the polyepoxide.

Derivatives of epichlorohydrin will give more reactive latent amines than the parent compound since the hydroxyl group can be tertiary or can be activated to give a urethane derivative which will decompose more readily.

The following examples show methods of making the one component self-curing epoxy-urethane resins and their ability to cure.

EXAMPLE 25

A solution of 232 grams Epon 836 and 230 grams of Rucothane N-14, a urethane prepolymer having an isocyanate equivalent weight of about 1200, commercially available from Hooker Chemical Co., in 230 grams of acetone in a resin kettle fitted with a stirrer and condenser was refluxed for 3 hours with three drops of stannous octoate catalyst. The solution set up on cooling to a gelatinous mass. The product after stripping off the solvent is rubbery. This melts, flows and cures well at 200° C.

EXAMPLE 26

A Brabender Plastograph with a roller mixing head was preheated to 80° C. At 30 RPM, 42 grams of DER 663U, epoxy resin and 18 grams of Rucothane N-14 diisocyanate prepolymer were mixed for 1 hour, the torque increasing gradually to 640 meter grams. The product was ground to a fine powder with the aid of dry ice in a Chemical Rubber Co. Micro Mill. The powdered product remained reactive for several years and cures well at 200° C.

EXAMPLE 27

A portion of Sample 26 was placed between samples of tin plate one inch wide and overlappping ¼ inch. Shims were used to produce a 4 mil film thickness. Samples were cured for 15 minutes at 200° C in a platen press. The lap shear strengths were measured with an Instron tensile tester. Forces of 1720 to 2300 psi. were required to pull apart three specimens.

Table IV below shows the curing of some epoxy urethanes. High ratios of latent amine to epoxide tend to give the fastest cures and the best values of adhesion to tin plate. Since there are two reactive NH bonds per latent amine, a ratio of 0.5 urethane/epoxide theoretically cures the resin completely. The rate of decomposition of urethane groups will increase with their concentration and ratios above 0.5 will give faster cures. The epoxy urethane system is unique in that unbroken urethane bonds contribute to the crosslinking of the resin. Thus, an epoxy urethane with a latent amine to epoxide ratio of 1.0 reacts rapidly. If half of the latent amine groups decompose, enough amine is formed to react with all of the epoxide groups. The remaining urethane groups will remain stable under normal use conditions and provide additional crosslinking.

TABLE IV

Epoxy Urethanes - Self-Curing Latent Amine Epoxy Resins

| No. | Epoxy Resin[a] | Diisocyanate[b] | Latent amine/epoxide[c] | Cure[d] min./200° C | Adhesion[e] psi. |
|---|---|---|---|---|---|
| 28 | Epon 834 | Solithane 291 | 0.29 | 60–240 | |
| 29 | Epon 836 | Rucothane N-14 | 0.45 | 10–60 | 0–28 |
| 30 | Epon 1001 | ET$_2$ | 0.64 | 10–30 | 760–1030 |
| 31 | Epon 1001 | Adiprene L-213 | 0.56 | 15–60 | |
| 32 | Epon 1002 | Adiprene L-213 | 0.37 | 15–60 | |
| 33 | DER 663U | Solithane 291 | 0.28 | 60–120 | 56–220 |
| 34 | DER 663U | Rucothane N-14 | 0.85 | 5–15 | 1720–2310 |
| 35 | Epon 1004 | Rucothane N-14 | 0.79 | 15–30 | 1160–1560 |
| 36 | Epon 1007 | Solithane 291 | 0.32 | 20–60 | |
| 37 | Epon 1007 | Solithane 291 | 0.80 | 20–60 | |

[a]Epon Resins from Shell Chemical Co. Epon 834 and 836 are semisolid bisphenol-A epoxy resins with epoxide equivalent weights of 230 to 280 and 290 to 333. Their hydroxyl functionality should be about 0.6 and 1.0. Epon 1001, 1002, 1004 and 1007 are solid bisphenol-A epoxy resins with epoxide equivalent weights of 450 to 550, 600 to 700, 875 to 1025 and 2000 to 2500 and hydroxyl contents of 2.5, 3.2, 4.5 and 10.4 equivalents per mole. DER 663U is a Dow Epoxy Resin with an epoxide equivalent weight of 730 to 840 and a hydroxyl equivalent weight of about 4.3
[b]Solithane 291 and Adiprene L-315 are as described in Table III. ET$_2$ represents polyethylene glycol of 1000 molecular weight reacted with two moles of tolylene diisocyanate. Rucothane N-14 is a liquid urethane prepolymer having an isocyanate equivalent weight of about 1200, commercially available from Hooker Chemical Co. Adiprene L-213 is a liquid urethane polymer having an isocycanate content of 9.25 to 9.65%, commercially available from DuPont.
[c]The latent amine functionality represents the urethane groups formed when the diisocyanate prepolymer reacts with hydroxyl groups in the epoxy resin backbone. These prepolymers contain other urethane groups that are not reactive as latent amines.
[d]Cure times at 200° C have been measured on heated surfaces and in an oven.
[e]Tensile shear specimens were prepared by overlapping 2 one inch wide strips of tin plated steel ¼ inch and bonding them with a 4 mil thick layer of epoxy urethane cured for 15 minutes at 200° C in a heated press. Shear strength in pounds per square inch was measured with an Instron Tensile Tester.

Epoxy resins of low hydroxyl functionality are limited in the amount of latent amine that can be formed as urethane groups bound directly to their backbone. The latent amine content of self-curing resins has been increased by reacting polyisocyanates with epoxy resins and another easily dehydrated alcohol. Such resins have quite high cure rates.

EXAMPLE 38

A solution of 113 grams of commerically available Epon 834 (0.22 mole, 0.13 eq. OH), 11.7 grams 2-methyl-3-buten-2 ol (0.14 mole), 157 grams Rucothane N-14 (0.26 eq. NCO, a diisocyanate prepolymer, commerically available from Hooker Chemical Co. having a MW of 1200) and three drops of stannous octoate in 86 grams acetone was allowed to stand at room temperature until isocyanate was not detectable by titration. The solution set up as a gelatinous solid. In warming the gelatinous solid becomes fluid and the acetone is readily stripped out to give a self-curing rubbery urethane-epoxy resin at room temperature, i.e.

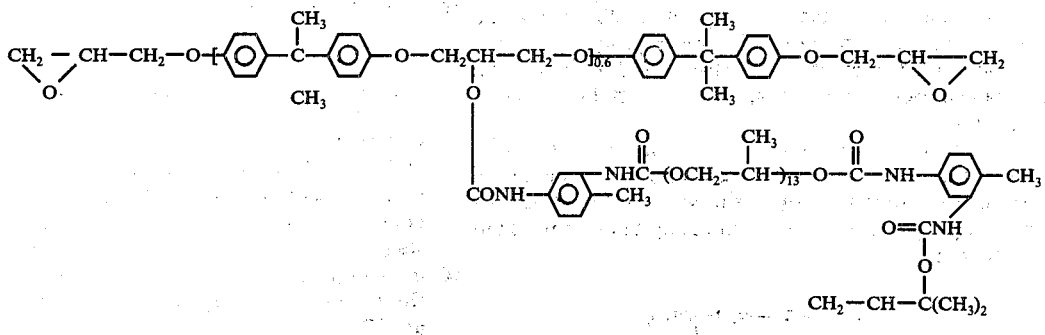

This material flows well on heating and appears to cure in two stages. In two minutes a product that is tacky and stringy at 200° C but firm at room temperature is formed. After about 30 minutes at 200° C a firm product is obtained. The product is still as reactive after two years at room temperature.

High ratios of diisocyanate to epoxy polyol will tend to give very viscous high molecular weight or even crosslinked epoxy urethanes. Samples 43 and 44 of Table V show that we can avoid this by using monoisocyanate with diisocyanate to make epoxy urethanes of low viscosity and high functionality that cure rapidly.

EXAMPLE 39

A solution of 100 grams Epotuf 37-807 (0.056 mole, 0.285 eq. OH), a solid epoxy resin, commerically available from Reinhold Chemical Co., 5 grams isophorone diisocyanate (0.045 eq. NCO), 5 grams propyl isocyanate (0.059 eq. NCO) and 3 drops stannous octoate in 100 grams acetone was allowed to react at room temperature until isocyanate was not detectable. The product gradually separated from solution as a viscous gum. This cures in 5 to 30 minutes at 200° C and is stable for more than 2 years at room temperature.

Both of the above techniques can be used to prepare latent amines of high functionality. These urethanes are useful as latent amine curing agents for other resins. Epoxy groups in the urethane can co-cure with the added resin.

Table V shows further examples of self-curing resins made with added alcohol or with monoisocyanate.

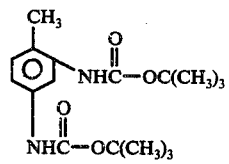

was obtained on cooling. A weighed sample of the latent amine product was heated at 200° C for 20 minutes resulting in a brown solid residue. A portion of the brown solid residue was partially dissolved in glacial acetic acid on a steam bath and then titrated with perchloric acid (dissolved in acetic acid). The end point indicated 1.13 meq. free amine/g. (6.9 wt.% as tolylene diamine).

The following example shows the curing of a polyhalide.

EXAMPLE 47

1.1 grams of a prepolymer terminated with allyl bromide functional groups commercially available from Polysar Ltd. under the tradename "Polysar RTV" and formed by the general process set out in U.S. Pat. No. 3,506,742 was admixed with 0.3 grams of the crystalline latent amine product from Example 1. After 2 minutes

TABLE V
Self-Curing Resins of High Latent Amine Content and Flow Melt Viscosity

| No. | Epoxy Resin[a] | Alcohol | Polyisocyanate | isocyanate | Mole Ratio[d] | Product Latent Amine Epoxide Ratio | Cure min./200° C |
|---|---|---|---|---|---|---|---|
| 40 | Epon 834 | 2-Methyl-3-buten-2-ol | FHP-3000[b] | | 2/1.2/1/0 | 0.56 | 5-30 |
| 41 | Epon 834 | 2-Methyl-3-buten-2-ol | Rucothane N-14 | | 1/0.6/0.6/0 | 0.59 | 2-30 |
| 42 | Epon 836 | 2-Methyl-3-buten-2-ol | Rucothane N-14 | | 1/1/1/0 | 1.00 | 2-30 |
| 43 | DER 663U | | Solithane 291 | Phenyl Isocyanate | 1.2/0/0.2/2.2 | 1.10 | 10-60 |
| 44 | Epotuf 37-807 | | Isophorone diisocyanate[c] | Propyl Isocyanate | 1.7/0/0.7/1.7 | 0.92 | 5-30 |

[a] Epon and DER resins described in footnote (a) of Table IV. Epotuf 37-807 is a solid epoxy resin with an epoxide equivalent weight of 575 to 725 and a hydroxyl functionality of about 5 available from Reichhold Chemicals, Inc.
[b] HYPOL FHP-3000 is a polyisocyanate prepolymer with an equivalent weight of 400 to 450 and a functionality of about 2.3, commercially available from W. R. Grace & Co.
[c] Isophorone diisocyanate is an aliphatic diisocyanate available from Veba Chemie.
[d] The mole ratio of Epoxy Resin/Alcohol/Polyisocyanate/Isocyanate per mole of product resin.

EXAMPLE 45

1,3 grams of the crystalline latent amine product from Example 1 (0.008 equivalent latent amine) and 1,5 grams solid hexene-1/maleic anhydride copolymer (1:1 molar ratio m pt. 156°-264° C), commercially available as PA-6 from Gulf Chem. Co. (0.008 equivalent anhydride) were dissolved in 2.3 grams acetone. A thick film of this solution was warmed at 60° C to evaporate the solvent and cured for 4 minutes at 155° to 160° C. A rigid foam, insoluble in acetone, was produced. A thin 2 mil thick film treated in the same manner cured to a hard clear film in two minutes at 155°-156° C.

To show the formation of the free amine on heating, the following example was carried out.

EXAMPLE 46

In a 500 cc resin kettle equipped with a stirrer, $N_2$ blanket, condensor and heating mantle 31.5 grams of 2,4-tolylene diisocyanate (0.362 eq. NCO) was dissolved in 175 grams of benzene and 5 drops of stannous octoate catalyst was added. 26.8 grams of tert-butyl alcohol (0.362 eq. OH) was added dropwise to the stirred mixture. The mixture was refluxed for 4 hours (80° C). A white crystalline latent amine product, i.e.

at 180° C the material cured to a non-tacky film.

This invention provides a means of making new and novel amine curing agents. The cured products resulting when polyepoxide, polyisocyanate and polyanhydride resins are cured with these amine curing agents are new and have unique and desirable properties. When the urethane compounds of our invention are based on easily dehydrated alcohols and isocyanate terminated prepolymers, the amines produced by heating them to 100°-200° C are unique products containing urethane groups in their backbone. These amine terminated prepolymers would be difficult to prepare by conventional urethane technology.

The isocyanate terminated prepolymers are prepared by reacting polyols, e.g. diols, triols, etc., and diisocyanates in a mole ratio of $x$ to $x(n-1)+1$, respectively, wherein $x$ is a number between 1 and 10 and $n$ is the functionality of the polyol. A polyol herein is a material containing two or more hydroxyl groups per molecule. These isocyanate terminated prepolymers after reaction with the secondary and tertiary alcohols herein and heating in the range 100°-200° C result in novel amine terminated polyurethane polymer-containing urethane groups in its backbone. These materials readily cure polyepoxy, polyhalide, polyisocyanate and polyanhydride resins. Polyisocyanates can be used as well to provide polyisocyanate prepolymers. Usually, but not necessarily, the diols and polyols used to prepare these prepolymers contain primary or secondary hydroxyl

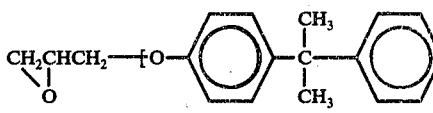 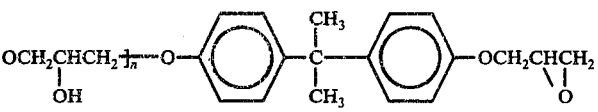

groups that are not easily dehydrated. When these prepolymers are reacted with easily dehydrated alcohols, polyurethanes are produced which contain stable urethane groups and also urethane groups capable of forming amine when heated to 100°–200° C.

Preferred diols are the polyether, polyester and hydrocarbon diols commonly used in preparing isocycanate terminated prepolymers. These include, but are not limited to, poly(ethylene oxide) diols and triols, poly(propylene oxide) diols and triols, poly(tetramethylene oxide) diol, hydroxyl terminated adipic acid/glycol prepolymers, poly(caprolactone) diols, hydroxyl terminated polybutadiene and the like. Examples of various amine terminated prepolymers containing urethane groups in the backbone after heating in the range 100°–200° C are shown herein in Examples 18, 23, 25 and 26, 28-37 and 40-43.

We claim:

1. A process of curing a polyepoxide resin which comprises forming, at a temperature of from 25 to 90 degress C, an epoxy resin containing latent amine groups therein which is the reaction product of
    (a) a member of the group consisting of tertiary alcohols and secondary alcohols with substituents in the alpha or beta position that activate dehydration; said member being a tertiary or secondary alcohol containing epoxy resin having the general formula:

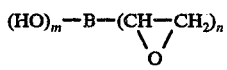

wherein B is an organic polyvalent moiety, n is at least about 2 and m is 0.5 or greater; and
    (b) an amount at least sufficient to produce substantially stoichiometric equivalents of latent amine to epoxy groups of an isocyanate of the formula:

R-(NCO)$_n$ wherein R is a mono- or polyvalent organic moiety and
n is an integer of from 1 to 3; and
thereafter, heating the formed latent amine-containing epoxy resin to a temperature of from 100° to 200° C.

2. The process according to claim 1 wherein the tertiary or secondary alcohol containing epoxy resin has the formula:

wherein n is at least 0.5.

3. The process according to claim 1 wherein the reaction product of the isocyanate and the tertiary or secondary alcohol containing epoxy resin is carried out in the presence of a stannous octoate catalyst.

4. The process according to claim 1 wherein the isocyanate is an isocyanate-terminated polyurethane polymer.

5. The process according to claim 2 wherein the isocyanate is an isocyanate-terminated polyurethane polymer.

6. The process according to claim 1 wherein said alcohol reactant (a) further comprises up to 1 mole per hydroxy equivalent of the tertiary or secondary alcohol containing epoxy resin of a low molecular weight, easily dehydrated alcohol selected from the group consisting of tertiary alcohols and secondary alcohols with constituents in the alpha or beta position that activate dehydration.

7. A polyurethane polymer having terminal latent amine groups therein and being devoid of urea groups therein.

8. An epoxy resin cured at a temperature in the range of from 100° to 200° C within a time period ranging up to 2 hours with a substantially stoichiometric amount of polyurethane polymer having terminal latent-amine groups therein and being devoid of urea groups therein.

9. An isocyanate-terminated polyurethane prepolymer cured at a temperature in the range of from 100° to 200° C within a time period ranging up to 2 hours with a substantially stoichiometric amount of a polyurethane polymer having terminal latent-amine groups therein and being devoid of urea groups therein.

10. The process of curing a member of the group consisting of a polyepoxide resin, polyisocyanate, isocyanate containing polyurethane, polyolefins having terminal allylic bromide groups and hexene/maleic anhydride copolymer resin which comprises admixing said group member with a substantially stoichiometric amount of a latent amine which is the reaction product of stoichiometric amounts of an isocyanate of the formula R-(-NCO)$_n$ wherein R is a mono- or polyvalent organic moiety and n is 1-3 and a member of the group consisting of tertiary alcohols and secondary alcohols with substituents in the alpha or beta position that activate dehydration and heating the admixture in the range 100°–200° C.

* * * * *